United States Patent [19]

Schär

[11] 4,449,308
[45] May 22, 1984

[54] ATHLETIC FOOTWEAR FOR BICYCLISTS

[76] Inventor: Hugo Schär, Hilti 2, 8444 Henggart, Switzerland

[21] Appl. No.: 363,076

[22] Filed: Mar. 29, 1982

[30] Foreign Application Priority Data

Apr. 16, 1981 [CH] Switzerland .................. 2542/81

[51] Int. Cl.³ .............................................. A43B 5/00
[52] U.S. Cl. .................................................... 36/131
[58] Field of Search ............................ 36/131, 59 R

[56] References Cited

U.S. PATENT DOCUMENTS

| 581,181 | 4/1897 | Spencer | 36/131 |
| 598,325 | 2/1898 | McIntyre | 36/131 |
| 4,188,737 | 2/1980 | Haver | 36/131 |

Primary Examiner—Patrick D. Lawson
Attorney, Agent, or Firm—Werner W. Kleeman

[57] ABSTRACT

A sport shoe or athletic footwear for bicyclists is disclosed which possesses at its contact or tread region coming into contact with the pedal of the bicycle an arcuate-shaped curvature upon which there is adjustably mounted a guide plate. This guide plate positions the shoe at the bicycle pedal and at the same time reinforces the shoe sole.

16 Claims, 2 Drawing Figures

ATHLETIC FOOTWEAR FOR BICYCLISTS

BACKGROUND OF THE INVENTION

The present invention relates to a new and improved construction of sport shoe or athletic footwear for bicyclists, especially for bicycle racers.

The athletic or sport shoes generally known at the present time possess soles at which there are mounted small metallic plates possessing a narrow slot-shaped recess extending transversely with respect to the shoe. These small metallic plates are adjusted and fixed in position by the bicyclist. This work is time-consuming and somewhat cumbersome, and additionally, it is also difficult to determine the ideal position of the plates at the shoes. Moreover, the conventional shoe soles possess domed or arched portions in the lengthwise and transverse direction, these domed portions being composed of a number of different radii.

SUMMARY OF THE INVENTION

The present invention aims at providing a new and improved construction of athletic footwear or sport shoe, the sole of which affords ideal conditions for retention of the foot and allows an exact guiding of the shoe to all sides.

Another important object of the present invention aims at the provision of a new and improved construction of sport shoe for bicyclists which enables accurately reproducing the guiding of the shoe and the mutual position between the shoe and the bicycle pedal and affords an easy adjustment and readjustment of the mutual position between the shoe and the bicycle pedal.

Still a further significant object of the present invention aims at a new and improved construction of athletic footwear wherein the sole of the shoe can be appreciably reinforced by a shoe plate.

A further important object of the present invention aims at providing a new and improved construction of a sport shoe for bicyclists, which is relatively simple in design, quite economical to manufacture, easy to use, and allows for a relatively simple accurate positioning between a plate provided at the underside of the shoe and the bicycle pedal, in order to ensure for the desired positioning of the shoe at the pedal and maximizing comfort of the wearer.

Now in order to implement these and still further objects of the invention, which will become more readily apparent as the description proceeds, the sport shoe of the present development is manifested by the features that the sole of the shoe is provided with an arcuate-shaped curvature at the region of contact with the bicycle pedal or pedal body, and within such contact region there is adjustably mounted a guide plate.

The sport shoe of the present development and the plate member or plate used in conjunction therewith can be advantageously employed with a bicycle pedal of the type disclosed in Belgian Pat. No. 885,267.

Additionally, the position of the shoe can be easily and reproducably adjusted with respect to the bicycle pedal.

A further advantage of the invention resides in the fact that there can be undertaken in an infinitely adjustable manner slight small defined corrections.

By virtue of the curved construction of the shoe sole and the guide plate it is possible to reinforce or stiffen the shoe, and thus to increase the service life of the shoe.

By virtue of the rather large expanse of the guide plate or plate member over a given surface area walking with the shoes become more comfortable. It is unnecessary to clean the shoe soles prior to ascending the bicycle, because there is avoided the use of the conventional slots which attract dirt and other contaminants.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, with a sport shoe 1 of generally known construction the shoe sole 2 possesses at the contact or tread region A a curved or arcuate shaped curvature R. The radius of curvature R is in a range of about 120 mm to about 300 mm, preferably between about 180 mm to 280 mm, and especially in the order of 200 mm to 260 mm, and essentially corresponds to the curvature of the contact surface of a pedal body or pedal 3 of a bicycle. It has been found desirable for the curvature R to amount to $230\pm4$ mm, by way of example and not limitation. Between the shoe 1 and the pedal 3 there is located a guide plate or plate member 4 which ensures for guiding of the shoe 1 essentially free of play. The curved contact region A preferably is at least 80 mm long.

Figure 1:
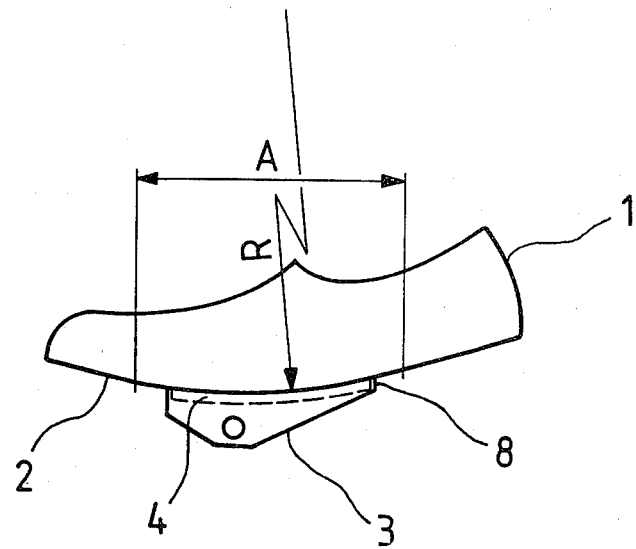
FIG. 1 is a side view of a sport shoe or athletic footwear and pedal body of a bicycle useable therewith and constructed according to the invention.
Figure 2:
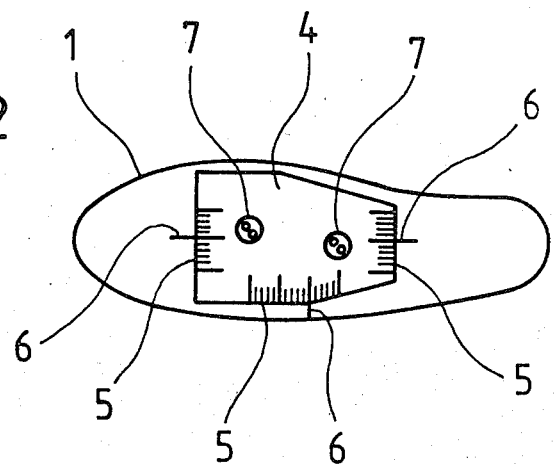
FIG. 2 is a bottom plan view of the shoe sole equipped with a shoe guide plate or plate member according to the invention.

This guide plate 4 is provided along the edges thereof, as best seen by referring to FIG. 2, with scales 5 or equivalent structure which, in each case, coact with a suitable marker or indicia 6 provided at the shoe sole 2. Of course, there could be a reversal of the parts, for instance the scales 5 also could be applied to the shoe sole 2 and the markers 6 then would be applied to the plate member 4. In place of the marker 6 there also could be provided a vernier scale, and therefore conceptually the elements 6 are to be construed as also encompassing such structure.

By means of two screws 7 or equivalent fixing expedients, which piercingly extend with lateral play through the plate member or plate 4, this plate member 4 is connected with the sole 2 of the shoe 1. The manner of threadably securing the plate member 4 with the shoe sole 2 is not subject matter of the invention and therefore need not here be further disclosed.

During fitting of a new shoe 1 the bicyclist or other appropriate mechanic or the like releasably secures, by means of the screws 7, the plate member 4 at the shoe sole 2 and then the bicyclist thereafter places the shoe 1 with the loosely affixed plate member 4 attached thereto in a suitable recess 8 of the pedal body or pedal 3. Now the bicyclist turns and displaces his or her foot into that position which is most ideal for him or her and thereafter there are tightened the attachment screws 7, and hence there is positively fixed the plate member 4 at the shoe 1. The user then can easily read at the scales 5 the adjusted or set position and can then correspondingly adjust the second shoe 1 and also based upon such readings undertake all future adjustments or can perform small defined corrections based upon the readings at the scales 5.

Any possible minimum deviations between the rigid plate member 4 and the shoe sole 2 arising because of possible mutual turning of such parts relative to one another can be taken-up by the shoe sole 2.

Of course, at a conventional shoe the sole can be provided, in accordance with the above-described explanations, by moulding such sole at the shoe.

While there are shown and described present preferred embodiments of the invention, it is to be distinctly understood that the invention is not limited thereto, but may be otherwise variously embodied and practiced within the scope of the following claims. Accordingly,

What I claim is:

1. A sport shoe for a bicyclist, especially for a bicycle racer and used with a bicycle pedal having a lengthwise direction of extent, comprising:
   a shoe sole having a contact region intended to come into contact with a bicycle pedal and possessing a substantially arcuate-shaped curvature which is substantially constant over the extent of said contact region in order to enable the bicyclist to carry out adjustments of the sport shoe in lengthwise direction relative to the lengthwise direction of extent of the bicycle pedal;
   a guide plate;
   said guide plate having a curved contact surface coming into contact with the contact region of the shoe sole and which is substantially identical to the substantially constant arcuate-shaped curvature of the contact region of the shoe sole; and
   means for adjustably mounting said guide plate within the contact region of substantially constant arcuate-shaped curvature of the shoe sole.

2. The sport shoe as defined in claim 1, wherein:
   the curvature of the contact region of the shoe sole has a radius in the order of 120 to 300 mm; and
   the curved contact region amounts to at least 80 mm in length.

3. The sport shoe as defined in claim 2, wherein:
   said radius of curvature amounts to about 180 to 280 mm.

4. The sport shoe as defined in claim 1, wherein:
   the curvature of the shoe sole at the contact region possesses a radius of curvature in the order of 230±4 mm.

5. The sport shoe as defined in claim 1, wherein:
   said means for adjustably mounting the guide plate at the shoe sole comprises releasable attachment means for adjustably and positionally fixing the guide plate at the shoe sole.

6. The sport shoe as defined in claim 1, wherein:
   said guide plate is structured to fit into a recess provided at the pedal and accommodated to the contour of the guide plate.

7. The sport shoe as defined in claim 6, wherein:
   said guide plate essentially possesses an expanse corresponding to the expanse of the bicycle pedal.

8. The sport shoe as defined in claim 1, wherein:
   said guide plate reinforces said shoe sole.

9. The sport shoe as defined in claim 1, wherein:
   said sport shoe is useable with a bicycle pedal having a recess for receiving said guide plate.

10. A sport shoe for a bicyclist, especially for a bicycle racer, comprising:
    a shoe sole having a contact region intended to come into contact with a bicycle pedal and possessing a substantially arcuate-shaped curvature;
    a guide plate;
    means for adjustably mounting said guide plate within the contact region of the shoe sole;
    said guide plate is provided with adjustable scale means; and
    means provided at the shoe sole coacting with said adjustable scale means.

11. The sport shoe as defined in claim 10, wherein:
    said means provided at the shoe sole comprises marker means.

12. The sport shoe as defined in claim 10, wherein:
    said means provided at said shoe sole comprises vernier scale means.

13. A sport shoe for a bicyclist, especially for a bicycle racer, comprising:
    a shoe sole having a contact region intended to come into contact with a bicycle pedal and possessing a substantially arcuate-shaped curvature;
    a guide plate;
    means for adjustably mounting said guide plate within the contact region of the shoe sole;
    said shoe sole is provided with scale means; and
    said guide plate is provided with means cooperating with said scale means.

14. The sport shoe as defined in claim 13, wherein:
    said means cooperating with said scale means comprises marker means.

15. The sport shoe as defined in claim 13, wherein:
    said means cooperating with said scale means comprises vernier scale means.

16. The combination of a sport shoe for a bicyclist, especially for a bicycle racer, and a bicycle pedal having a lengthwise direction of extent, comprising:
    a bicycle pedal having a curved contact surface;
    a shoe sole having a contact region intended to come into contact with the bicycle pedal and possessing a substantially arcuate-shaped curvature which is substantially constant over the extent of said contact region in order to enable the bicyclist to carry out adjustments of the sport shoe in lengthwise direction relative to the lengthwise direction of extent of the bicycle pedal;
    said substantially constant arcuate-shaped curvature of the contact region of the shoe sole and the contact surface of said bicycle pedal substantially corresponding to one another;
    a guide plate;
    said guide plate having a curved contact surface coming into contact with the contact region of the shoe sole and which is substantially identical to the substantially constant arcuate-shaped curvature of the contact region of the shoe sole; and
    means for adjustably mounting said guide plate within the contact region of substantially constant arcuate-shaped curvature of the shoe sole.

* * * * *